United States Patent
Chamberlain et al.

(10) Patent No.: US 6,562,448 B1
(45) Date of Patent: May 13, 2003

(54) LOW DENSITY DIELECTRIC HAVING LOW MICROWAVE LOSS

(75) Inventors: Craig S. Chamberlain, Woodbury, MN (US); Joan V. Brennan, Sierra Madre, CA (US); Constance L. Gettinger, Minneapolis, MN (US); Robert W. Wilson, Austin, TX (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/544,067

(22) Filed: Apr. 6, 2000

(51) Int. Cl.$^7$ .................. B32B 5/00; B32B 11/02; B32B 25/02; B32B 27/20

(52) U.S. Cl. .............. 428/312.6; 428/313.9; 428/332; 428/402; 428/403

(58) Field of Search ............... 428/323, 402, 428/403, 332, 312.6, 313.9

(56) References Cited

U.S. PATENT DOCUMENTS

| | | | |
|---|---|---|---|
| 4,288,337 A | 9/1981 | Ota et al. ................ 252/512 |
| 4,467,330 A | 8/1984 | Vidal et al. .............. 343/872 |
| 4,482,513 A | 11/1984 | Auletti .................. 264/39 |
| 4,568,603 A | 2/1986 | Oldham .................. 428/195 |
| 4,612,242 A | 9/1986 | Vesley et al. ............ 428/313.9 |
| 4,618,525 A | 10/1986 | Chamberlain et al. ...... 428/209 |
| 4,621,052 A | 11/1986 | Wright .................. 427/205 |
| 4,937,585 A | 6/1990 | Shoemaker .......... 343/700 MS |
| 5,063,384 A | 11/1991 | Novak et al. ............ 342/1 |
| 5,084,711 A | 1/1992 | Moss et al. ........... 343/911 R |
| 5,085,931 A | 2/1992 | Boyer, III et al. ......... 428/328 |
| 5,232,775 A | 8/1993 | Chamberlain et al. ...... 428/323 |
| 5,245,151 A | 9/1993 | Chamberlain et al. ... 219/10.57 |
| 5,254,824 A | 10/1993 | Chamberlain et al. ... 219/10.57 |
| 5,278,377 A | 1/1994 | Tsai .................. 219/759 |
| 5,294,763 A | 3/1994 | Chamberlain et al. ..... 219/729 |
| 5,298,903 A | 3/1994 | Janos .................. 342/4 |
| 5,318,797 A | 6/1994 | Matijevic et al. ....... 427/213.31 |

(List continued on next page.)

FOREIGN PATENT DOCUMENTS

| | | |
|---|---|---|
| EP | 0 162 979 A1 | 12/1985 |
| EP | 0 496 112 | 7/1992 |
| GB | 2 204 588 | 11/1988 |
| GB | WO 90/13927 | * 11/1990 |
| JP | 64-89209 | 4/1989 |
| JP | 5-307911 | 11/1993 |
| JP | 11-323046 | 11/1999 |
| WO | WO 90/13927 | 11/1990 |
| WO | WO 96/18219 | 6/1996 |
| WO | WO 97/20324 | 6/1997 |
| WO | WO 97/32314 | 9/1997 |

OTHER PUBLICATIONS

Lee, "Numerical Methods Make Lens Antennas Practical", *Microwaves*, Sep. 1982, pp. 81–84.

Ingerson, "Luneberg Lenses Performance Limitations Due to Fabrication Process", IEEE, 1997, pp. 862–865.

*Primary Examiner*—Paul Thibodeau
*Assistant Examiner*—Nikolas Uhlir
(74) *Attorney, Agent, or Firm*—Dean M. Harts; Douglas B. Little (57) ABSTRACT

Disclosed is a composite material comprising a matrix material comprising a microwave transmissive polymer; and from about 1 to 65 volume percent of a particulate filler dispersed in the matrix. This particulate filler is characterized by an electrically conductive coating on the filler particles, particles selected from spheroids and ellipsoids having a major dimension below about 0.5 mm and particles having an aspect ratio greater than about 2 to 1 having a minor dimension below 100 $\mu$m, and a combination of particle size and coating thickness sufficient to yield a combination of a composite material dielectric constant between about 1.2 to 100, and a composite material microwave loss tangent no greater than about 0.10 at 1 GHz.

18 Claims, 3 Drawing Sheets

U.S. PATENT DOCUMENTS

| | | | |
|---|---|---|---|
| 5,354,611 A | 10/1994 | Arthur et al. | 428/325 |
| 5,389,434 A | 2/1995 | Chamberlain et al. | 428/323 |
| 5,409,968 A | 4/1995 | Clatanoff et al. | 523/204 |
| 5,497,168 A | 3/1996 | Thomas et al. | 343/834 |
| 5,506,053 A | 4/1996 | Hubbard | 428/402 |
| 5,525,663 A | 6/1996 | Oien | 524/590 |
| 5,529,708 A | 6/1996 | Palmgren et al. | 252/62.54 |
| 5,552,210 A | 9/1996 | Horn, III et al. | 428/209 |
| 5,691,059 A | 11/1997 | Moh | 428/404 |
| 5,756,936 A | 5/1998 | Viebranz et al. | 174/73.1 |
| 5,844,523 A * | 12/1998 | Brennan et al. | 343/700 |

* cited by examiner

LOW DENSITY DIELECTRIC HAVING LOW MICROWAVE LOSS

TECHNICAL FIELD

This invention relates to composite materials including a filler and a polymer, in which the composite has low density, low microwave loss and a predetermined dielectric constant.

BACKGROUND

Microwave lenses and antennas can be made from microwave transmissive high dielectric materials, such as plastics that contain high dielectric constant fillers.

High-density inorganic compounds, such as titanium dioxide and barium titanate, can be used as fillers in the preparation of high dielectric materials for microwave applications. As the volume loading of these fillers is increased to elevate the dielectric constant of a composite material, the density of the composite material also increases. Lower density high dielectric materials have been made by coating metal onto relatively large particles of low density materials.

Microspheres are relatively small, substantially spherical particles, either solid or hollow. Hollow microspheres are also called microbubbles. Microspheres are frequently made of glass. Microspheres with a metal coating have been incorporated into polymeric articles.

DISCLOSURE OF INFORMATION

Briefly, the present invention provides a composite material comprising a matrix material comprising a microwave transmissive polymer; and from about 1 to 65 volume percent of a particulate filler dispersed in the matrix. The particulate filler is characterized by an electrically conductive coating on the filler particles, particles selected from spheroids and ellipsoids having a major dimension below about 0.5 mm (preferably below about 0.2 mm) and particles having an aspect ratio greater than about 2 to 1 having a minor dimension below 100 $\mu$m, and a combination of particle size and coating thickness sufficient to yield a combination of a composite material dielectric constant between about 1.2 to 100, and a composite material microwave loss tangent no greater than about 0.10 at 1 GHz.

In another aspect, the present invention provides a composite material comprising a matrix material comprising a microwave transmissive polymer; and from about 1 to 65 volume percent of a filler comprising microspheres dispersed in the matrix. The filler microspheres include an electrically conducting coating, with particularly useful electrically conducting coatings including, for example, aluminum, stainless steel, titanium, and tungsten. The filler microspheres are also characterized by: an average particle size in the range of 10 to 350 $\mu$m; a density below about 3.5 g/cc; and a combination of particle size and coating thickness sufficient to yield a combination of a composite material dielectric constant between about 1.2 to 100, and a composite material microwave loss tangent no greater than about 0.10 at 1 GHz.

As used herein:

"matrix" means a network of polymeric material, which may be continuous or discontinuous and may include voids and/or a gas;

"filler" means coated or uncoated particles, which may be hollow or solid and which may be made from inorganic materials such as glass or ceramics or organic materials such as polymers and may be in various shapes such as spheres, fibers, and/or flakes;

"electrically conductive" means having a resistivity between about $10^{-6}$ to $10^0$ ohm-cm;

"major dimension" means the largest of a particle's diameter, length, width, cross-section, or thickness, and "minor dimension" means the smallest of a particle's diameter, length, width, cross-section, or thickness, where both major and minor dimensions can be directly measured or classified by standard screening techniques or particle sizing equipment;

"substantially hollow" means encompassing at least some void or gas;

"bubbles" means substantially hollow particles, usually having a spherical shape;

"microbubble" and "microsphere" mean a sphere below about 350 $\mu$m particle size;

"density" means the ratio of weight to a volume of particulate material such as described in ASTM D2840;

"melt processable" as applied to hollow microspheres, means capable of withstanding pressures such as typically encountered during mixing with a polymer melt or forming operations to make lenses or antennas, without crushing a majority of the microspheres;

"metal coated" means substantially encapsulated by an electrically continuous metal layer;

"chemical blowing agent" means a material that can be incorporated into an extrudable polymer and that decomposes at temperatures above the temperature used during extrusion, to produce a gas, such as nitrogen or carbon dioxide, so that the gas introduces voids in a polymer matrix when the material is heated above its decomposition temperature; and "significantly ruptured" means microspheres damaged to an extent that renders them ineffective as a low density filler.

It is an advantage of the present invention to provide a low density, predetermined dielectric constant, composite material with low dielectric loss in the microwave frequency region. The composite material dielectric constant can be selected within a wide range. Increasing the volume fraction of the preferred filler in the composite material increases the dielectric constant of the composite material. In some embodiments, increasing the volume fraction of filler reduces, rather than elevates, the density of the composite material. These inventive materials are useful, for example, in microwave antennae and microwave lens applications, especially where weight is an important consideration.

DETAILED DESCRIPTION

The composite material of the present invention has a low density, a low dielectric loss in the microwave frequency region, and a dielectric constant that may be selected from a range between about 1 and 100.

The matrix material can be continuous or discontinuous. The polymer of the matrix material can be solid or foamed. The matrix material includes a microwave transmissive polymer that functions to bind the filler materials together. It is preferably stable at temperatures above 65° C. (150° F.) (more preferably above 95° C. (200° F.)). It is typically inexpensive, preferably being the lowest cost material in the composite on a weight basis.

The microwave transmissive polymers useful in this invention range from nonpolar materials to polar or aromatic materials, as the loss tangent generally increases with both the polarity or aromaticity of the polymer and the amount included in the composite material. Thus, polar or aromatic materials are useful in the present invention if present at low levels. Nonpolar and saturated materials are preferred for high levels of polymer in the composite material. The microwave transmissive polymers useful in this invention preferably have no significant functionality that absorbs microwave frequencies.

Examples of useful polymers include cellulose acetates, natural rubbers, polyamides, polyesters, polyethylenes, polypropylenes, polymethylmethacrylates, fluoropolymers, polyurethanes, synthetic rubbers, and silicones. Polyolefins are preferred due to properties including low cost, microwave transmission, and ease of processing. Saturated polyolefins and polyolefins including some unsaturated segments are more preferred than materials including aromatic segments and polymers of greater polarity. Suitable elastomeric binders include natural rubbers, synthetic rubbers, and silicone compounds.

The matrix material may also include microwave absorbing aromatics and polymers with functional groups that absorb microwaves, provided that the quantity thereof is insufficient to increase the composite material dielectric loss tangent above 0.10 at 1 GHz.

The particulate filler has a lower density than typical fillers used to increase the dielectric constant of composite materials, and it does not substantially increase the dielectric loss when mixed into the composite material. The filler size, shape, and composition are selected for a particular application and frequency range with microspheres, acicular fibers, and/or flakes being preferred. The filler is coated with electrically conductive material, as described below. The density of the particulate filler in the inventive composite material is preferably below about 3.5 g/cc (more preferably below 2.7 g/cc). For some applications, a particulate filler having a density below about 1.0 g/cc is preferred. The desired dielectric constant of the composite material for a particular application is determined by the type and amount of filler used. As the desired dielectric constant increases, materials well known in the art made with titanium dioxide or barium titanate filler must be made with greater filler content and increasing density. Desirably, the density of the inventive composite material decreases as the dielectric constant increases.

Acicular fibers may comprise polymeric materials, or inorganic materials such as ceramic or milled glass. A preferred acicular fiber is chopped strand glass fiber (available as Fiberglas® Milled Fibers 731ED 1/32 inch from Owens Corning, Toledo, Ohio). These fibers have an average diameter of 15.8 μm and an aspect ratio of 40:1. Mica is preferred for inorganic flakes. A preferred mica flake material has an average density of 2.9 g/cc and an average surface area of 2.8 $m^2$/g (available as Suzorite™ 200HK, from Zemex Industrial Minerals, Inc., Toronto, Ontario, Canada). Hollow microspheres are preferred over fillers traditionally used to enhance a composite dielectric constant, such as titanium dioxide. Such microspheres are formed preferably from glass, ceramic and/or polymeric materials. The preferred material for microspheres is glass, but ceramic and polymeric materials are suitable.

A preferred particulate filler comprises hollow glass microspheres. An average outer diameter in the range of 10 to 350 μm is suitable. The preferred range of average outer diameters of the microspheres is 15 to 50 μm. The preferred density for the microspheres is about 0.25 to 0.75 g/cc (more preferably about 0.30 to 0.65 g/cc), as measured following ASTM D2840. The preferred glass microspheres are soda-lime-borosilicate glass (Scotchlite™ Glass Bubbles available from Minnesota Mining and Manufacturing Co. (3M), St. Paul, Minn.). Generally, these microspheres should be strong enough to withstand hydrostatic pressure of preferably at least about 6.9 MPa (1,000 psi) without the microspheres being significantly ruptured. Crushed microspheres increase the composite material density and do not contribute to the desirable low density, low microwave loss features of the present invention. The preferred type K37 Scotchlite™ Glass Bubbles meet this objective. These K37 glass bubbles have an average density of 0.37 g/cc, an average diameter of about 40 μm, and an isostatic crush strength of 3,000 psi (20.7 MPa) with a target survival of 90% and a minimum survival of 80%. Even stronger microspheres may be used, such as S60/10,000 Scotchlite™ Glass Bubbles with an isostatic crush strength of 10,000 psi (68.9 MPa) and an average diameter of about 30 μm, although these have a greater average density of 0.60 g/cc.

The particulate filler comprises from about 1 to 65 (more preferably about 5 to 45) volume percent of the composite material. At levels below about 1 volume percent no significant change in the dielectric constant of the composite material occurs. Levels above about 65 volume percent are less desirable because there may be insufficient matrix material to hold the composite material together. In a foamed or starved matrix composite materials, a significant amount of the remaining 35 volume percent can be air or another gas. Embodiments of the invention having filler volume loading factors in the higher end of the range preferably include stronger microspheres, e.g. S60/10,000, to avoid significantly rupturing the microspheres when melt processing the inventive composite materials.

An electrically conductive coating layer is provided on the surface of the particulate filler to substantially encapsulate the filler. The electrically conductive coating materials are selected considering the frequency range of a particular application. Desirable properties are: wetting the surface at the thickness used, low cost, and the availability of the material. Preferred materials include aluminum, stainless steel, titanium, and tungsten.

A discontinuous layer of electrically-conducting material, such as occurs when the coating forms beads on the surface, is not favored because this can reduce the dielectric constant. Preferably, the electrically conductive coating layer thickness ranges from about 5 to 500 nanometers (nm) (more preferably about 10 to 100 nm) for composite materials having low loss in the microwave frequency range. Layers below about 100 nm in thickness are more desirable for lower density composite materials.

For a given size filler particle, the thickness and type of the electrically conductive coating are important factors in the level of dielectric loss. It has been found that very thin coatings lead to very high microwave loss. While not wishing to be bound by any particular theory, this is believed to be due to coupling with the electric field of the microwave radiation. This type of microwave loss decreases as the electrically conductive coating thickness increases. However, as the electrically conductive coating thickness increases, microwave loss due to coupling with the magnetic field component of the microwave radiation increases. A minimum microwave loss has now been achieved at an intermediate electrically conductive coating thickness, at which coupling with both components of the microwave radiation is low.

Figure 3:
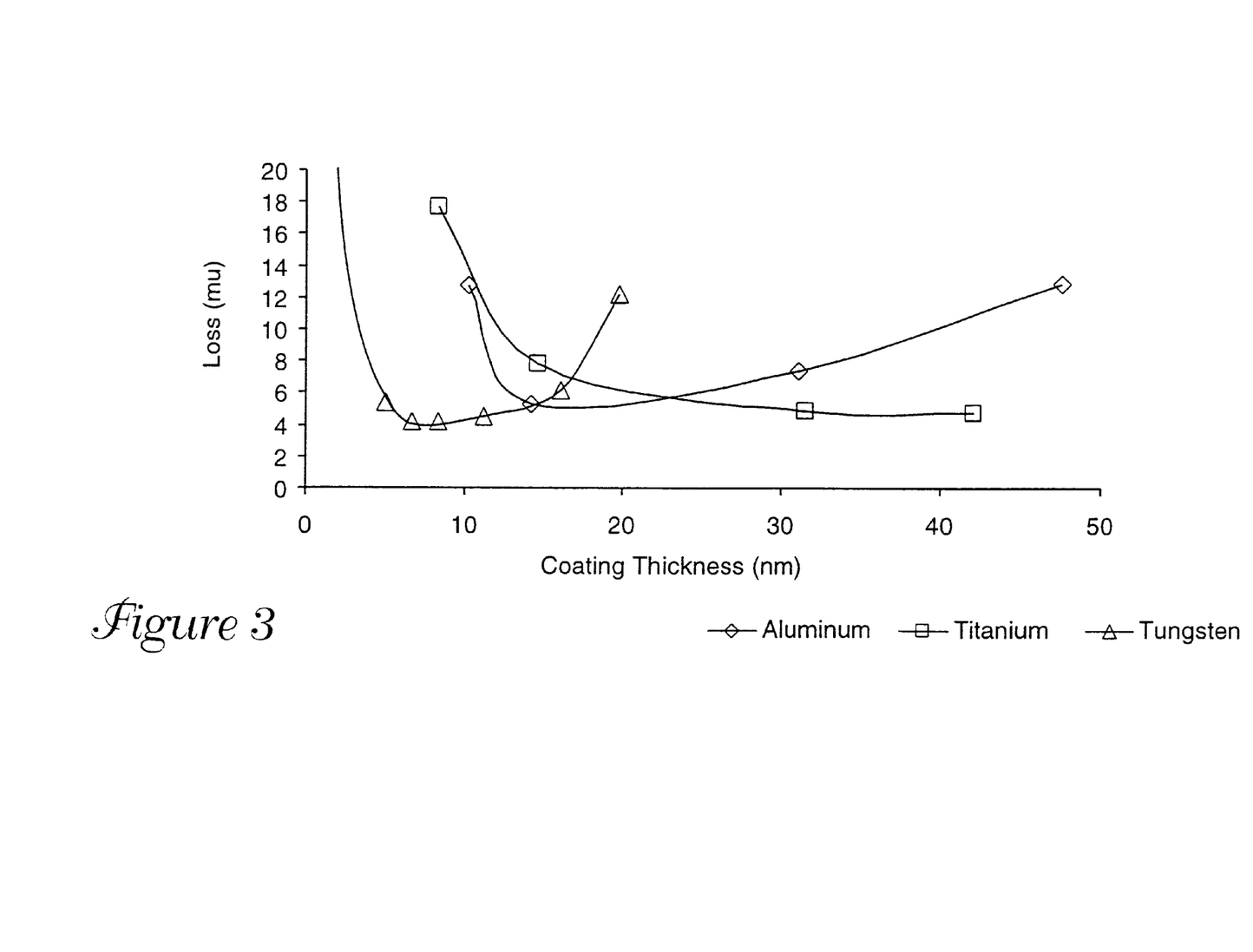
FIG. 3 is a graph showing the dielectric loss tangent measured at 10 GHz of an embodiment of the inventive composite material with 15 volume percent filler versus the coating thickness of three metals.

The microwave loss of the composite material is affected by at least six variables: (1) metal thickness, (2) metal type, (3) filler shape, (4) filler size, (5) microwave frequency, and (6) the microwave loss of the matrix material in the composite. At a given frequency and filler shape and size, the loss varies with metal type and thickness. Each metal generally has a minimum loss at a specific experimentally determined metal thickness. This is illustrated in FIG. 3 where microspheres were coated with three different metals, each with several different thickness values. As seen, each metal had a minimum loss achieved by a different metal thickness. A lower loss is also obtained with metal coatings near the lower end of the metal thickness range when the diameter of a microbubble or a fiber decreases or as the thickness of a flake decreases. Low loss values are more difficult to obtain as the microwave frequency increases.

A substantially electrically insulating layer may be provided on the electrically conductive coating. Such an insulating layer preferably substantially encapsulates the particulate filler. This layer can stabilize the electrically conductive layer, such as by preventing oxidation over time that could otherwise reduce the effective thickness of the electrically conductive layer. Some thin electrically conductive coatings are susceptible to oxidation so that a portion of the coating or the entire coating becomes non-conductive. For example, thin tungsten coatings show measurable changes in powder resistivity when exposed to air, sometimes within a matter of hours. Complete bleaching of the color of the metal coated particles can occur within days or weeks as the dark gray to black metal layer is converted to white or colorless oxide. The addition of a protective insulating layer such as aluminum suboxide prevents this. The expected result for partial oxidation of a electrically conductive coating optimized for minimal absorption is that the effective thickness would decrease, causing an increase in absorption. The expected result for a completely oxidized coating is that the metal oxide coated particle would not function as a high dielectric filler.

Such an insulating layer may be thin, for example about 4 nm. The material for this coating is preferably selected for compatibility with the electrically conductive coating to avoid undesirable chemical reactions. For example, when aluminum is used for the electrically conductive coating, an aluminum suboxide is suitable for the insulating layer.

The insulating layer is provided by any useful means. In general, this is accomplished by introducing oxygen into the deposition process under conditions and in quantities sufficient to form oxides of the electrically conductive coating material, such as aluminum oxide when the electrically conducting layer comprises aluminum.

It has been found through experimentation that dielectrics can be prepared using fillers with or without an additional insulating layer. At lower volume loadings, only very occasionally would contact between spheres occur to change the dielectric properties and then by only an insignificant amount. At higher volume loadings, however, the filler particles are more likely to be in electrical contact. Such contact can cause the material to become a weakly electrically conductive material that may absorb and reflect, rather than transmit electromagnetic radiation. Although such a material may have a significant dielectric constant, the accompanying microwave dielectric loss will limit its use. For example, a lens would refract, but also absorb a significant amount of the signal. The addition of the insulating layer can substantially reduce the electrical conductivity between particles, so that a high dielectric can be formed which transmits, rather than absorbs the electromagnetic energy.

Blends of two or more polymers with or without compatibilizers may also be used, provided the resultant blend has sufficient mechanical properties for the intended application. At low coated filler loading levels and low frequencies, below about 1 GHz, nearly all polymers will function in the matrix material, even those with significant polarity. Microwave loss increases as coated filler loading increases and as frequency increases, so polymers with less functionality and less aromaticity and no polarity are preferred. For composite material applications from about 6 to 10 GHz, polyolefins and polytetrafluoroethylene are most preferred. Thus, the present invention provides a composite material having low loss from the high MHz (above $10^8$ Hz) to the high GHz range (above $10^{12}$ Hz).

The inventive composite material can be compared to a reference composite material that is similar in composition to the inventive composite material. This reference composite material contains a sufficient quantity of a titanium dioxide or barium titanate filler, or another suitable commercially available microwave transmissive filler, to provide a dielectric constant within about 5% of that of the inventive composite material. The inventive composite material contains the fillers of the present invention. The inventive composite material preferably has a density less than about 95% of the density of the reference composite material (more preferably less than 85%).

In view of the foregoing discussion, a preferred filler material for the present invention is glass microspheres with four properties: an electrically conductive coating; a non-electrically conductive layer enclosing the electrically conductive coating; a low density; and sufficient strength to be melt processable. A more preferred filler material for the present invention is hollow glass microspheres that have even lower density.

Non-electrically conductive filler particles such as glass bubbles or milled glass fibers can be coated with a thin metal film by any useful means, such as by conventional coating techniques. These techniques include: physical vapor deposition methods such as sputter deposition, evaporative coating, and cathodic arc coating; chemical vapor deposition; and solution coating techniques such as electroless plating or mirroring. In each case proper care must be taken to ensure that the particle surface is properly exposed to the metal source so that the particle may be uniformly coated and to ensure that the proper film thickness is obtained. For example, in sputter deposition, particles can be stirred under metal vapor flux in which the coating thickness is controlled by exposure time and deposition rate. An insulating coating may be provided in a similar process, for example, by depositing metal with concurrent addition of oxygen in the vicinity of the particulate surfaces.

A composite material may be formed by incorporating the coated particles into a thermoplastic material. This can be done by any useful means, for example, by melting the thermoplastic material and mechanically mixing the coated particles into the melt. Typical equipment for such processes include single and twin screw extruders, for which process conditions are preferably chosen such that the coated particles are intimately and uniformly blended with the thermoplastic, while not suffering mechanical damage such as abrasion or fracture. The resulting composite materials can be shaped into a final article by any useful means. Examples of such articles include lenses and planar antennas. Melt processing techniques such as injection molding, or heated platen presses may be used.

A continuous matrix results when the particulate filler is substantially encompassed by the matrix material with no substantial voids. A discontinuous matrix is formed with lower quantities of matrix material than used for a continuous matrix. The particulate filler is bound together in the discontinuous matrix, yet a continuous path normally cannot be traced through the network without leaving the matrix material.

The composite material may include another component having a dielectric constant lower than the polymer of which the matrix is comprised. For example, voids, or a gas, may be incorporated into the composite material along with the filler, leading to a foamed matrix that is generally lower in density than an unfoamed matrix of otherwise similar composition. Incorporating air or another gas into a polymer would normally reduce the density, however it would also reduce the dielectric constant. An advantage of the present invention is that adding metal-coated, hollow microsphere fillers to a polymer allows the composite dielectric constant to approximate that of the unfilled polymer in the foamed matrix material. That is, a foamed composite material can have a dielectric constant the same or similar to the dielectric constant of the polymer in the matrix material, yet have a lower density.

A blowing agent is a material useful in achieving the foamed composite material. Suitable chemical blowing agents are stable at the extrusion temperatures, but decompose at higher temperatures to produce a gas, such as nitrogen or carbon dioxide. The gas thus generated foams the matrix material. A preferred chemical blowing agent when using low density polyethylene (LDPE) as a microwave transmissive polymer is p,p'-oxybis (benzenesulfonyl hydrazide) (available as Celogen™ OT from Uniroyal Chemical Co., Middlebury, Conn.).

Foamed or starved systems with a lower volume loading of microspheres are used to achieve dielectric constants of around 1.2. Changing the filler shape to high aspect ratio fibers or flakes and increasing the filler loading are used to achieve higher composite material dielectric constants between 50 and 100.

A lens is an article shaped to bend or focus radiation via refraction. The index of refraction guides lens design for materials transparent to visible light. Similarly, the dielectric constant guides lens design for other materials (for low microwave loss materials the index of refraction can be approximated by the square root of the dielectric constant). A lens structure having a planar, convex, concave, hemispherical, or spherical shape can be formed using the composite materials described above. See, for example, J. J. Lee, "Numerical Methods Make Lens Antennas Practical", *Microwaves,* pages 81–84 (September 1982), which is incorporated herein by reference. These materials may be particularly useful in constructing lenses with a plurality of layers with each layer capable of having a dielectric constant the same as or different from another layer. One example of a lens where the inventive composite materials are useful is known in the art as a Luneberg lens, which uses a large number of dielectric materials having different dielectric constants. More detail regarding this use can be found in the art. For example, see P. G. Ingerson, "Luneberg Lens Performance Limitations Due to Fabrication Process", IEEE Antennas and Propagation Society International Symposium, pages 862–865 (1997), which is incorporated herein by reference. Using such a layered structure of composite material allows focusing on a particular frequency range and bandwidth of interest. This structure can also eliminate the need to direct the lens toward the radiation source, allowing a fixed lens position. The lenses are therefore suitable for two way microwave frequency communication (e.g., between a ground station and satellite). The inventive composite materials also may be used to construct supports for the lens.

The composite materials of the invention are also useful in dielectric antennas. For example, an antenna substrate made from these composite materials can have a particular dielectric constant and low loss in the microwave frequency range. Further antenna uses are described in U.S. Pat. No. 5,844,523, the disclosure of which is incorporated herein by reference.

The fillers and composite materials of the present invention can become lower in density as the dielectric constant is increased through adding a higher volume percent of the preferred filler into the inventive composite material, as described above. The low density feature of these composite materials enables them to occupy large volumes and yet be installed on buildings, vehicles, aircraft, in orbiting satellites, or anywhere lower weight is a desirable attribute. Additionally, the inventive materials provide low loss in the high frequency range of microwave communications, and they are compatible with conventional thermoplastic processing techniques.

Objects and advantages of this invention are further illustrated by the following examples, but the particular materials and amounts thereof recited in these examples, as well as other conditions and details, should not be construed to unduly limit this invention.

EXAMPLES

Test Methods

Conductive Coating Thickness

The surface area of the microspheres was determined using the BET surface area method. The weight percent of metal on the microspheres was determined by dissolving portions of the coated particles in dilute hydrofluoric acid in combination with nitric, hydrochloric, or sulfuric acid as appropriate. The resulting solutions were analyzed by Inductively Coupled Argon Plasma Atomic Emission Spectroscopy to obtain the weight percent metal on the particles. The thickness of the conductive coating on the particle was estimated using the following relationship:

$$CT=(1{,}000 \times (WT)/(100-WT))/SA \times CD)$$

wherein CT=coating thickness (nm), WT=weight percent metal, based on the total weight of the particle; SA=specific surface area (m$^2$/g); CD=coating density (g/cc).

Coated Filler Density

A Model 930 Beckman Air Comparison Pycnometer was used to measure the volume (V) of a coated filler sample. The mass (M) was determined for the same sample using a balance. The coated filler density (D) was calculated from the relationship:

$D=M/V.$

Composite Density

The densities of these samples were measured by weighing small samples on a Mettler high precision balance. The samples were then placed under water. The mass of water displaced was used to measure the volume of the sample using the density of water at room temperature of 1 g/cc. To calculate the density of the sample, the measured mass was divided by the measured volume.

Dielectric Measurements

The dielectric properties of the films at 905 MHz were measured at room temperature (23° C.) using an RF impedance/material analyzer (Model HP 4291A from Hewlett Packard, Palo Alto, Calif. The test used a capacitance measurement modified for high frequency. An HP 16453A dielectric test fixture (available from Hewlett Packard) was also used.

The dielectric properties of the films at 6.0 and 10.0 GHz were measured at room temperature. The 6.0 GHz measurements were made with a Dielectric Split Post Resonator test method. The 10.0 GHz measurements were made with a TE01n mode cylindrical hollow waveguide resonator and the swept, Scattering Parameter spectrum S21 (f), i.e., the ratio of a transmitted signal to an input signal as a function of frequency, was measured in the vicinity of the "013" resonance at 10 GHz with an HP8510c Vector Network Analyzer. The complex electrical permittivity measurements had an error of ±0.1% for the real part and ±0.0001 for the loss tangent for both the 6.0 and 10.0 GHz measurements. Q factors (i.e., quality factor of the resonance) that were very high (more than 30,000) and accompanying narrow bandwidths were obtained. Such high Q factors means the resonance was defined over a very narrow frequency width, as associated with a low loss material. The cavity fields were excited and measured. Cavity fields are electromagnetic fields within a metal box using one probe to excite an electric field and a second probe to receive the energy, with measurements taken before and after a sample is inserted into the box to determine the decline in resonance that occurs. Using the complete cylindrical boundary value problem solution, exact calculations of the dielectric constant and loss tangent were performed on the Cavity Q's and resonant frequencies that were obtained from the S21(f) spectrum. A correction was made to account for the finite conductivity of the cavity walls.

| Materials Used | |
|---|---|
| Material | Description |
| Titanium Dioxide | Available as Ti-Pure R960 from DuPont, Wilmington, Delaware. |
| Tungsten | Available as tungsten machined flat stock, 99.95 weight percent pure, from Teledyne Advanced Materials, Huntsville, Alabama. |
| 304 stainless steel | Available as 304 stainless steel plate from Specialty Steel and Forge, Fairfield, New Jersey. |
| Aluminum | Available as 1100F aluminum plate from Central Steel and Wire, Chicago, Illinois. |
| Titanium | Available as titanium plate from Astro Metallurgic, Inc., Wooster, Ohio. |
| Polymer A | Room-temperature curing, high strength, transparent liquid silicone rubber, product number RTV 615 from General Electric Co., Silicone Products Division, Waterford, New York. |
| Polymer B | Low density polyethylene having a melt-flow index of 3.5, available as Tenite ™ 1550F, from Eastman Chemical Co., Kingsport, Tennessee. |
| Polymer C | A thermoplastic polyolefin elastomer that is described as a polymer alloy of an ethylene propylene rubber and crystalline polypropylene, and is UV-stabilized, available as HiFax ® CA10G from Montell USA, Wilmington, Delaware. |
| Polymer D | An ethylene-based butene plastomer available as Exact ™ 4023 Plastomer from Exxon Chemicals, Houston, Texas. |
| Polymer E | High density polyethylene, available as Fina HDPE 1285, from Fina, Bayport, Texas. |
| Polymer F | An ethylene propylene rubber/polypropylene designated SRD-7462 from Shell Chemicals, Houston, Texas. |
| Polymer G | A partially crosslinked thermoplastic polyolefin elastomer available as HiFax ® MXL42D01 TPE from Montell USA. |

Procedure 1: Preparation of Coated Fillers

Coated Filler A was prepared by sputter coating K37 glass microbubbles with tungsten (W). The filler was first screened through a 325 mesh (45 μm) sieve, then through a 400 mesh (38 μm) sieve (only used for Coated Filler A), to remove the smallest particles. The filler particles that did not pass through the sieve were then floated in methanol and those that did not float were discarded to remove the highest density particles. The particles that did float were allowed to dry in air. The sieved, floated, and dried particles were placed in a vacuum chamber that was evacuated to a pressure of about $1.3 \times 10^{-5}$ torr ($1.73 \times 10^{-3}$ Pa) and back-filled with about 3 millitorr (0.4 Pa) argon sputtering gas. The particles were slowly tumbled in the chamber while being sputter coated with tungsten vapor. The cathode was a directly water-cooled tungsten plate 5 inches by 8 inches (127 mm by 203 mm). The sputtering apparatus operated in a direct current planar magnetron mode at an applied power as shown in Table 1. The metal coated filler was then sputter coated in a similar manner with an aluminum target for 2.00 hours at 1.00 kilowatt (kW) while oxygen was admitted into the chamber in the vicinity of the particles at a rate of 3.5 standard cubic centimeters per minute (sccm). This produced an insulating layer of non-stoichiometric aluminum oxide of a thickness of approximately 2 nm over the conductive layer.

Coated Fillers B through G were made as Coated Filler A except S60 microbubbles were used without sorting by size, and the sputter target was 304 stainless steel (SS). The operating conditions are shown in Table 1. Non-stoichiometric aluminum oxide deposition conditions were 3.00 hours at 4.00 kW at 20.0 sccm oxygen flow.

Coated Fillers H through K were made as Coated Filler A except the sputter target was aluminum (Al) and the K37 bubbles used were those retained on a 325 mesh screen (which were not subsequently floated in methanol). The operating conditions are shown in Table 1. Non-stoichiometric aluminum oxide deposition conditions were 2.00 hours at 0.80 kW at 4.0 sccm oxygen flow.

Coated Fillers L through O were made as Coated Filler A except the sputter target was titanium (Ti) and the K37 bubbles used were those retained on a 325 mesh screen (which were not subsequently floated in methanol). The operating conditions are shown in Table 1. Non-stoichiometric aluminum oxide deposition conditions were 2.00 hours at 0.80 kW at 4.0 sccm oxygen flow.

Coated Fillers P through V were made as Coated Filler A and the K37 bubbles used were those retained on a 325 mesh screen (which were not subsequently floated in methanol). The operating conditions are shown in Table 1. Non-stoichiometric aluminum oxide deposition conditions were 2.00 hours at 0.80 kW at 4.0 sccm oxygen flow.

Coated Filler W was prepared by sputter coating milled glass fibers (GF) with stainless steel. Non-stoichiometric aluminum oxide deposition conditions were 4.50 hours at 8.00 kw at 35.0 sccm oxygen flow.

Coated Filler X was made as Coated Filler B except no aluminum oxide insulating coating was applied over the conductive coating. The operating conditions are shown in Table 1, where coating thickness (CT) is also reported.

TABLE 1

| Filler Sample | Particle Metal | Particle Type | Particle Sizing (μm) | Particle Bed Weight (g) | Coat Power (kW) | Coat Time (hr) | Total Power (kWh) | CT (nm) |
|---|---|---|---|---|---|---|---|---|
| A | W | K37 | 45/38 | 30 | 1.00 | 4 | 4.0 | 12.1 |
| B | SS | S60 | unsized | 700 | 0.55 | 5 | 2.75 | 1.4 |
| C | SS | S60 | unsized | 700 | 0.80 | 5 | 4.0 | 1.8 |
| D | SS | S60 | unsized | 700 | 2.00 | 5 | 10.0 | 4.3 |
| E | SS | S60 | unsized | 700 | 3.50 | 5 | 17.5 | 7.4 |
| F | SS | S60 | unsized | 700 | 8.00 | 10 | 80 | 28.5 |
| G | SS | S60 | unsized | 700 | 8.00 | 20 | 160 | 53.9 |
| H | Al | K37 | 45 | 36 | 2.40 | 4 | 9.6 | 10.3 |
| I | Al | K37 | 45 | 36 | 0.60 | 4 | 2.4 | 14.2 |
| J | Al | K37 | 45 | 36 | 1.20 | 4 | 4.8 | 31.1 |
| K | Al | K37 | 45 | 36 | 2.40 | 4 | 9.6 | 47.5 |
| L | Ti | K37 | 45 | 36 | 1.00 | 4 | 4.0 | 8.3 |
| M | Ti | K37 | 45 | 36 | 2.00 | 4 | 8.0 | 14.7 |
| N | Ti | K37 | 45 | 36 | 4.00 | 4 | 16.0 | 31.5 |
| O | Ti | K37 | 45 | 36 | 6.00 | 4 | 24.0 | 42.1 |
| P | W | K37 | 45 | 36 | 0.30 | 4 | 1.2 | 2.5 |
| Q | W | K37 | 45 | 36 | 0.60 | 4 | 2.4 | 5.0 |
| R | W | K37 | 45 | 36 | 0.80 | 4 | 3.2 | 6.7 |
| S | W | K37 | 45 | 36 | 1.00 | 4 | 4.0 | 8.4 |
| T | W | K37 | 45 | 36 | 1.20 | 4 | 4.8 | 11.2 |
| U | W | K37 | 45 | 36 | 1.80 | 4 | 7.2 | 16.2 |
| V | W | K37 | 45 | 36 | 2.40 | 4 | 9.6 | 19.8 |
| W | SS | GF | unsized | 1570 | 8.00 | 20 | 160 | 51.1 |
| X | SS | S60 | unsized | 700 | 8.00 | 5 | 40 | 15.0 |

Procedure 2: Blending Composites Containing Coated Microbubbles

The coated particles were added to the polymer melt in a Brabender batch mixer (Model PL 2100, available from Brabender Instruments, South Hackensack, N.J.) maintained at a temperature of 125° C. The composite was formed by blending the two materials together by rotating blades at 70 rpm for approximately 10–15 minutes until a constant torque measurement was achieved, to form a substantially uniform molten composite. A flat film of composite was formed by first placing molten composite between two pieces of polyester liner to form a three-layer sandwich. The sandwich was subsequently placed between two aluminum plates to form a sandwiched assembly. The assembly was inserted into a heated Carver lab press (Model 2518, available from Fred S. Carver Co., Wabash, Ind.) and molded into flat film at a pressure of about 6.9 MPa (1000 psi) and temperature of 107° C. (225° F.). Shims were inserted between the aluminum plates to control the thickness of each sample. Each composite film had a diameter of approximately 18 cm (7 inches) and a thickness of approximately 0.10–0.15 cm (40–60 mils).

Procedure 3: Blending Foam Composites Containing Coated Microbubbles

The coated particles were added to a polymer melt in the Brabender batch mixer maintained at a temperature of 125° C. A chemical blowing agent (p,p'-oxybis (benzene sulfonyl hydrazide), available as Celogen™ OT from Uniroyal Chemical Co., Middlebury, Conn.) was added to the molten polymer at a concentration of 10 parts by weight blowing agent to 100 parts by weight polymer. The temperature was below that of the decomposition temperature of the chemical blowing agent. The composite was formed by blending the three materials together by rotating blades at 70 rpm until a constant torque measurement was achieved, approximately 10–15 minutes, to form a substantially uniform molten composite. A flat film of composite was formed by first placing molten composite between two pieces of polyester liner to form a three-layer sandwich. The sandwich was subsequently placed between two aluminum plates to form a sandwiched assembly. The assembly was inserted into the heated Carver press and molded into flat film at a pressure of 6.9 MPa (1000 psi) and temperature of 107° C. (225° F.). Shims were inserted between the rectangular aluminum plates to control the thickness of each sample. Each composite film had a diameter of approximately 18 cm (7 inches) and a thickness of approximately 0.10–0.15 cm (40–60 mils). An aluminum mold was used to shape the foamed composite material. The mold had two matching parts, each approximately 3.125×4.0×0.5 inches (7.9×10.0×1.3 cm) with a recess centered in each mold part. The recess in each part was approximately 2.125×3.0 inches (5.4×7.6 cm) and 0.025 inches (0.0635 cm) deep. A rectangular sample of the composite material having dimensions of 2.125×3.0 inches (5.4×7.6 cm) was cut and placed into the recess of the mold. The two mold parts were then secured together with the recess of each mold part aligned to provide a cavity 0.05 inches (0.13 cm) deep that contained the composite material. The mold was then placed in an oven maintained at a temperature of 250° C. for about two minutes to foam the material. The mold was then removed from the oven and the assembly (mold with the foamed composite material inside) was quenched in ice water. Then the foamed composite sample was removed from the mold.

EXAMPLE 1 AND COMPARATIVE EXAMPLE 1

Samples illustrate the effect of filler volume loading on composite density for fillers of the invention and commercial filler.

Example 1 composite samples 1-A to 1-D were made as described in Procedure 2 with Coated Filler A, tungsten coated microbubbles (W/MB), and Polymer B matrix where the volume loading of filler was varied. Control B was made without filler. Comparative Example 1 composite samples CE1-A to CE-C were made with titanium dioxide filler and Polymer B matrix where the volume loading of filler was varied.

Each composite sample was tested for dielectric constant (K) and composite density. The filler loading and test results are reported in Table 2 and shown in FIGS. 1 and 2.

TABLE 2

| Composite Sample | Filler | Filler Vol % | Density g/cc | K |
|---|---|---|---|---|
| 1-A | W/MB | 10 | 0.87 | 2.73 |
| 1-B | W/MB | 30 | 0.74 | 6.03 |
| 1-C | W/MB | 40 | 0.68 | 9.34 |
| 1-D | W/MB | 50 | 0.65 | 15.7 |

TABLE 2-continued

| Composite Sample | Filler | Filler Vol % | Density g/cc | K |
|---|---|---|---|---|
| Control B | none | none | 0.89 | 2.23 |
| CE1-A | TiO$_2$ | 5 | 1.05 | 2.76 |
| CE1-B | TiO$_2$ | 10 | 1.21 | 3.36 |
| CE1-C | TiO$_2$ | 20 | 1.54 | 4.40 |

Figure 1:
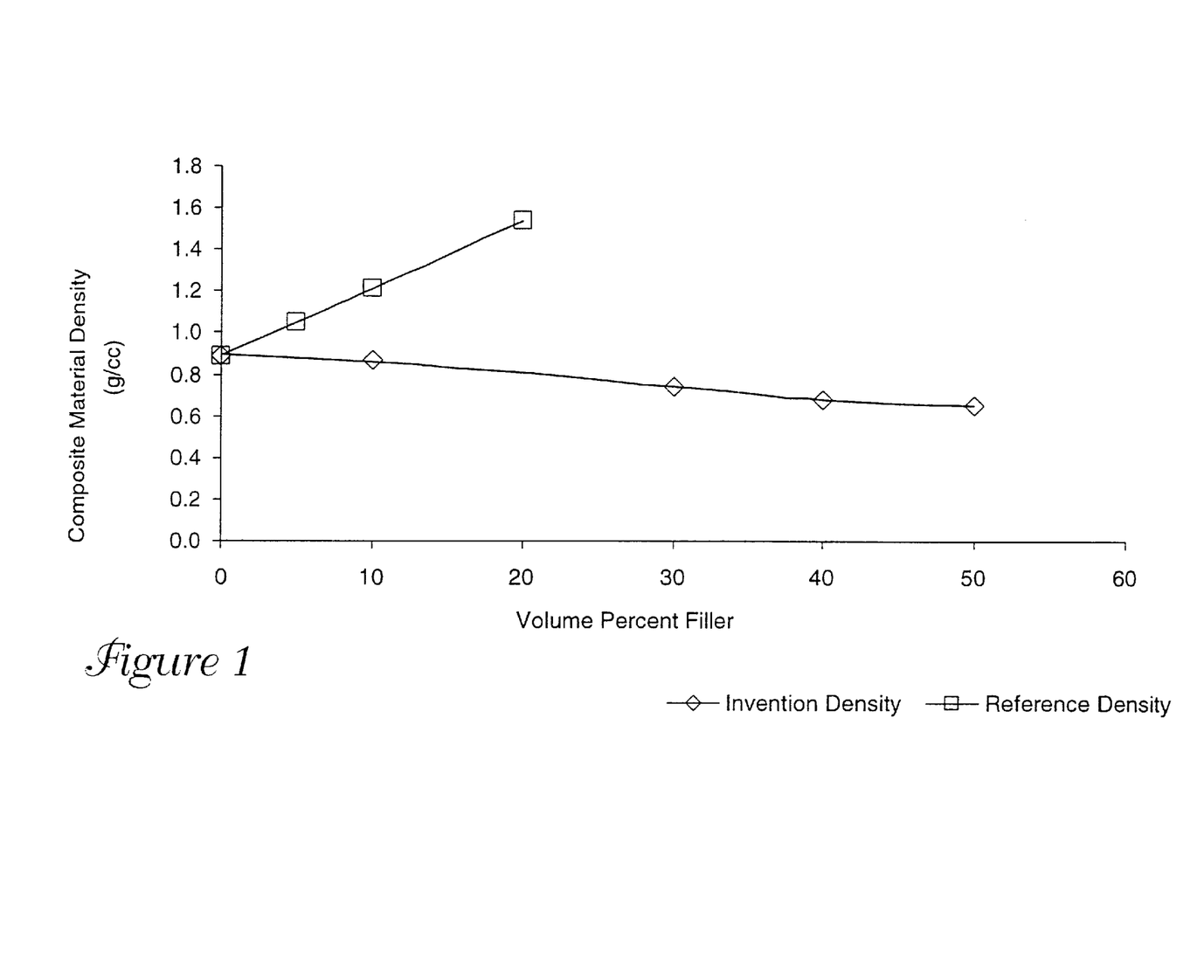
FIG. 1 is a graph showing the density of a composite material with various filler loading levels of an inventive composite material and a reference composite material containing titanium dioxide filler.

As seen in the above table and in FIG. 1, the density of the composite material embodiments of the present invention decreased as the volume loading of coated filler increased. In contrast, the density in composites made with commercial microwave transmissive filler increased linearly as the volume loading of the filler increased.

Figure 2:
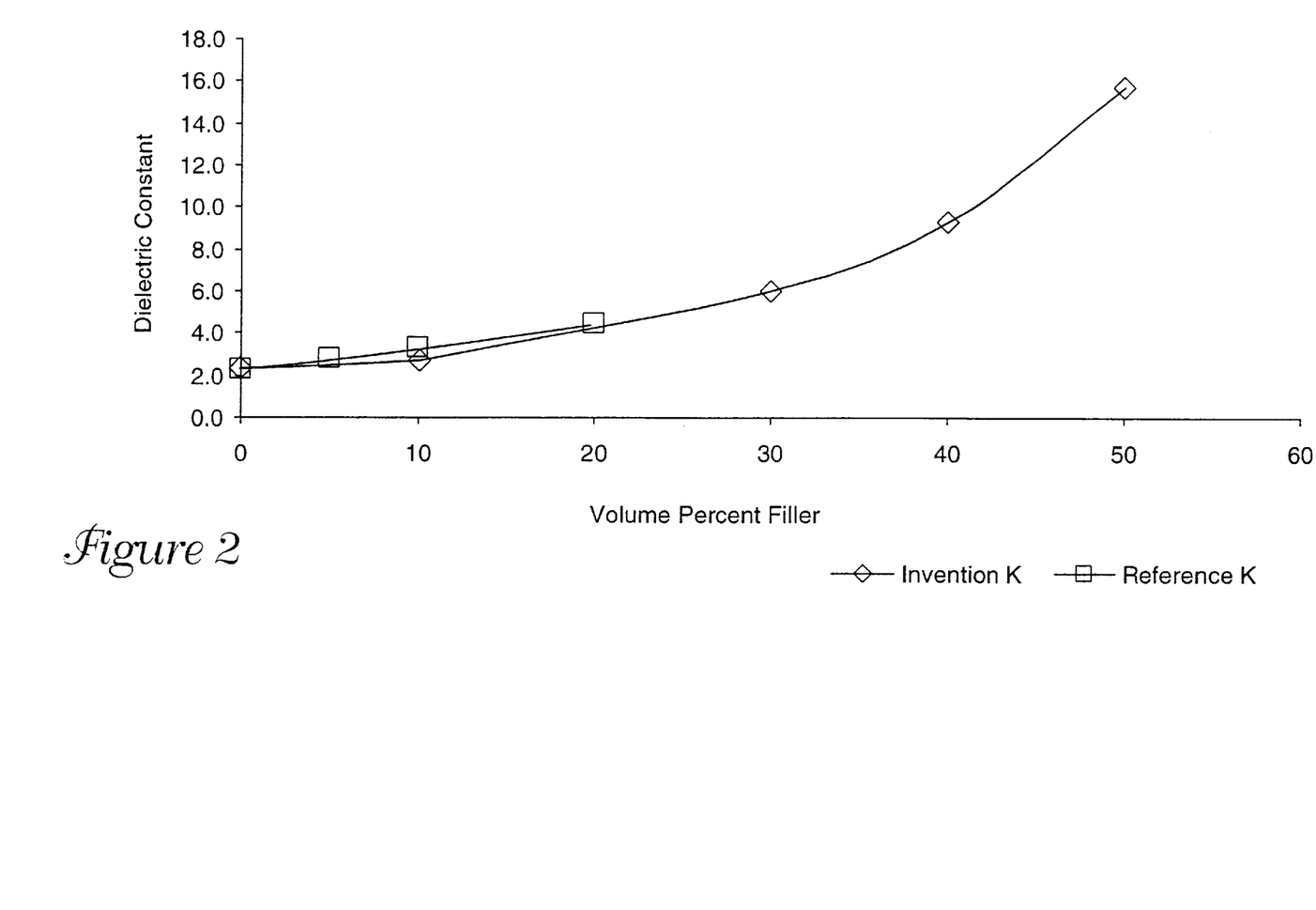
FIG. 2 is a graph showing the dielectric constant of a composite material with various filler loading levels of an inventive composite material and a reference composite material containing titanium dioxide filler.

Table 2 and FIG. 2 show that the dielectric constant of the embodiments of the present invention increased as the filler volume loading increased. In addition, considering both FIGS. 1 and 2, comparatively high dielectric constants are possible with the invention without increasing the total weight of an article of similar size, relative to reference material. In fact, using an embodiment of the present invention would decrease the weight of such an article.

EXAMPLE 2

Samples illustrate the effect of thickness of conductive coating on filler on composite loss tangent.

Example 2 composite samples 2-A to 2-F were made by following Procedure 2. The fillers were Coated Fillers B through G, stainless steel (SS) coated microbubbles having a metal coating thickness that varied, used at 20 volume % of the composite material. The polymer matrix was Polymer C. The bulk conductivity of the stainless steel was $1.39 \times 10^4$ (ohm-cm)$^{-1}$ as reported in the Handbook of Chemistry and Physics, 66th edition, CRC Press Inc, Boca Raton, Fla.

Each composite sample was tested for Loss Tangent at 6 GHz, reported in milliunits (mu). The average conductive coating thickness and test results are reported in Table 4.

TABLE 3

| Composite Sample | CT (nm) | Loss (mu) |
|---|---|---|
| 2-A | 1.4 | 78.90 |
| 2-B | 1.8 | 58.6 |
| 2-C | 4.3 | 11.8 |
| 2-D | 7.4 | 14.7 |
| 2-E | 28.5 | 33.1 |
| 2-F | 53.9 | 51.1 |

As seen in Table 3, the loss tangent at 6 GHz had a minimum at a stainless steel coating thickness of about 4.3 nm.

EXAMPLE 3

Samples illustrate the effect of fillers having different conductive coatings on composite properties.

Example 3 composite samples were made as Example 2 except conductive coatings having different bulk conductivities were used at 20 volume percent. Samples 3-A to 3-D were made with Coated Fillers H through K, microbubbles coated with different amounts of aluminum (Al) having a handbook conductivity of $3.78 \times 10^5$ (ohm-cm)$^{-1}$. Samples 3-E to 3-H were made with Coated Fillers L through O, microbubbles coated with different amounts of titanium (Ti) having a handbook conductivity of $2.38 \times 10^4$ (ohm-cm)$^{-1}$. Samples 3-I to 3-P were made with Coated Fillers P through V, microbubbles coated with different amounts of tungsten (W) having a handbook conductivity of $1.77 \times 10^5$ (ohm-cm)$^{-1}$. All composite samples were made with a Polymer B matrix.

Each composite sample was tested for loss tangent at 10 GHz. The average conductive coating thickness and test results are reported in Table 4 and shown in FIG. 3.

TABLE 4

| Composite Sample | Conductive Coating | | Loss |
|---|---|---|---|
| | Type | CT (nm) | mu |
| 3-A | Al | 10.3 | 12.8 |
| 3-B | Al | 14.2 | 5.23 |
| 3-C | Al | 31.1 | 7.38 |
| 3-D | Al | 47.5 | 12.91 |
| 3-E | Ti | 8.3 | 17.7 |
| 3-F | Ti | 14.7 | 7.83 |
| 3-G | Ti | 31.5 | 4.79 |
| 3-H | Ti | 42.1 | 4.69 |
| 3-I | W | 2.5 | High Loss |
| 3-J | w | 5.0 | 5.33 |
| 3-K | W | 6.7 | 4.23 |
| 3-L | W | 8.4 | 4.19 |
| 3-M | W | 11.2 | 4.51 |
| 3-N | W | 16.2 | 6.18 |
| 3-O | W | 19.8 | 12.21 |

As seen in Table 4 and FIG. 3, the loss tangent at 10 GHz had a minimum at an aluminum coating thickness of about 15 nm, a minimum at a tungsten coating thickness of about 8 nm, and a mininum at a titanium coating thickness of 40 nm or above. This example showed that there was a minimum in the loss tangent for each metal, and it was different for each. Correlation with bulk conductivity in the literature was not expected because the conductivity of very thin films can deviate substantially from the bulk conductivity of the material from which the thin film is made.

EXAMPLE 4

Samples illustrate the orientation effects on the dielectric constant of composite materials having high aspect ratio filler particles.

Glass fiber composite Examples 4-A to 4-C were made with 10 volume % stainless steel coated glass fibers in a matrix of Polymer A. In Example 4-A, the sample hardened or cured in the presence of a 50 Oersted (Oe) (3.98 kA/m) magnetic field applied with a direct current solenoid coil oriented in the plane of the sample (the xy-plane). In Example 4-B, the composite hardened with no further treatment. In Example 4-C, the sample hardened in the presence of the same magnetic field as Example 4-A but oriented in the z-axis normal to the major axes of the flat sample. Control C was made as Example 4 except without filler.

The dielectric constant of each sample was measured. Each composite sample was inspected for orientation uniformity under a 32X optical microscope. This inspection showed that the coated fiber orientation in Example 4-A was in the major plane of the sample. In Example 4-B the coated fibers were randomly aligned. In Example 4-C the coated fibers were highly aligned normal to the major plane of the flat sample.

The dielectric constant of each sample was determined by inserting it between the plates of a parallel plate capacitor. The capacitance was measured using an RCL meter with the electric field oriented along the z-axis. The dielectric constant was calculated using the equation $$K = Cd/\epsilon_O A$$

where C is the capacitance, d is the sample thickness, $\epsilon_O$ is the permittivity of free space, and A is the area of the sample. Dielectric measurements made at 0.3 GHz were in agreement with this data. The fiber orientations and calculated dielectric constants are reported in Table 5.

TABLE 5

| Composite Sample | Orientation | Percent of Z-axis orientation | K |
|---|---|---|---|
| 4-A | xy-plane | 0 | 4.6 |
| 4-B | random | 33 | 5.6 |
| 4-C | z-axis | 100 | 11.9 |
| Control C | N/A | N/A | 3.0 |

As seen in Table 5, the dielectric constant of the composite can also be altered by controlling the amount of z-axis orientation of coated filler when the coated filler is asymmetrically shaped.

EXAMPLE 5

Samples illustrate the effect of different polymer matrices on composite properties.

Example composite samples 5-A, 5-B and 5-C were made as Example 2 except with Coated Filler X, microbubbles coated with stainless steel and aluminum oxide at 20 volume % loading, and matrix polymer of Polymer D, Polymer E and Polymer F, respectively.

Each composite sample was tested for Loss Tangent at 905 MHz. The test results are reported in Table 6.

TABLE 6

| Composite Sample | Matrix Polymer | K | Loss (mu) |
|---|---|---|---|
| 5-A | Polymer D | 4.29 | 3.2 |
| 5-B | Polymer E | 4.78 | 3.6 |
| 5-C | Polymer F | 4.05 | 3.2 |

As seen in Table 6, the loss tangent can be influenced by the choice of matrix polymer.

EXAMPLE 6

Samples illustrate the effect of a different polymer matrix form on composite properties.

Example 6 was made with 30 volume % (before foaming) Coated Filler E in a Foam Composite Containing Coated Microbubbles using Procedure 3. Control D was made as Example 6 but without coated microbubbles.

The example was tested for dielectric constant (K) at 10 GHz and composite density (g/cc). The test results are reported in Table 7.

TABLE 7

| Composite Sample | Matrix Polymer | K | Density |
|---|---|---|---|
| 6 | Polymer B | 3.44 | 0.47 |
| Control D | Polymer B | 1.53 | 0.45 |

As seen in Table 7, the composites of the invention can have much a higher dielectric constant than a typical foam while still having a density similar to that of foam without filler.

EXAMPLE 7

Samples illustrate the effect of frequency on composite loss tangent.

Example 7 composite samples 7-A to 7-E were made as described in Procedure 2 with various volume percents of Coated Filler A, sieved microbubbles coated with tungsten, in a Polymer B matrix. Control E sample was made of Polymer B without coated microbubbles.

Each composite sample was tested for dielectric constant (K) and loss tangent at two frequencies. The test results are reported in Table 8.

TABLE 8

| Sample | Filler Vol. % | 0.9 GHz | | 10 GHz | |
|---|---|---|---|---|---|
| | | K | Loss (mu) | K | Loss (mu) |
| 7-A | 10 | 2.73 | 0.83 | 3.16 | 2.81 |
| 7-B | 20 | N/A | N/A | 4.85 | 5.32 |
| 7-C | 30 | 6.03 | 1.50 | 7.07 | 12.54 |
| 7-D | 40 | 9.34 | 8.62 | 10.08 | 22.1 |
| 7-E | 50 | 15.7 | 2.93 | 15.35 | 22.6 |
| Control E | 0 | — | — | 2.24 | 0.24 |

As seen in Table 8, microwave transmissive composites of the invention have higher loss tangent values at higher frequencies, but remain low loss while the dielectric constant increases.

EXAMPLE 8

This sample illustrates the effect of filler particles without an insulating coating on composite properties.

The composite was made as described in Procedure 2, using Coated Filler X dispersed at 20 volume % loading and a matrix of Polymer D. The resulting composite had a dielectric constant of 4.8 and a loss tangent at 0.9 GHz of 5 mu.

The loss at 0.9 GHz was acceptably low, demonstrating that, for low loadings, low loss can be obtained without an insulating layer on the filler particle.

Various modifications and alterations of this invention will become apparent to those skilled in the art without departing from the scope and principles of this invention, and it should be understood that this invention is not to be unduly limited to the illustrative embodiments set forth hereinabove.

We claim:

1. A composite material comprising:
   a matrix material comprising a microwave transmissive polymer; and
   from about 1 to 65 volume percent of a particulate filler dispersed in the matrix, the particulate filler being characterized by:
   an electrically conductive coating 5 to 500 nanometers thick on the filler particles,
   particles which are spheroids having a particle size in the range of 10–350 µm and a density below 3.5 g/cc, the combination of particle size and coating thickness being sufficient to yield a composite material dielectric constant from 1.2 to 100, and a composite material microwave loss tangent no greater than 0.10 at 1 GHz.

2. The composite material of claim 1 wherein the composite material has a density less than about 95% of the density of a reference composite material which is the same as the composite material except that the particulate filler is replaced with a sufficient quantity of particulate barium titanate to provide a dielectric constant within about 5% of that of the composite material.

3. The composite material of claim 1 wherein the filler is in a form selected from microspheres, fibers, or flakes.

4. The composite material of claim 1 further comprising a substantially electrically insulating coating on the electrically conductive coating of the particulate filler.

5. The composite material of claim 1 wherein the matrix comprises a polymer selected from cellulose acetates, natural rubbers, polyethylenes, polypropylenes, fluoropolymers, synthetic rubbers, and silicones.

6. A lens comprising the composite material of claim 1 having a planar, convex, concave, hemispherical, or spherical shape.

7. An antenna comprising the composite material of claim 1.

8. A composite material comprising:
a matrix material comprising a microwave transmissive polymer; and
from about 1 to 65 volume percent of a filler comprising microspheres dispersed in the matrix, the filler microspheres being characterized by:
a metal coating 5 to 500 nanometers thick and selected from the group consisting of aluminum, stainless steel, titanium, and tungsten,
an average particle size in the range of 10 to 350 µm,
a density below 3.5 g/cc, the combination of particle size and coating thickness being sufficient to yield of a composite material dielectric constant from 1.2 to 100, and a composite material microwave loss tangent no greater than 0.10 at 1 GHz.

9. The composite material of claim 8 wherein the polymer is selected from cellulose acetates, natural rubbers, polyethylenes, polypropylenes, fluoropolymers, synthetic rubbers, and silicones.

10. The composite material of claim 8 further comprising another component having a dielectric constant lower than the polymer of which the matrix is comprised.

11. The composite material of claim 8 wherein the matrix is continuous, discontinuous, or foamed.

12. A lens comprising the composite material of claim 8 having a planar, convex, concave, hemispherical, or spherical shape.

13. The lens of claim 12 comprised of at least 2 layers each comprising a composite material.

14. An antenna comprising the composite material of claim 8.

15. The composite material of claim 7, wherein the microwave transmissive polymer matrix contains a chemical blowing agent.

16. The composite material of claim 8 wherein the filler comprises hollow microspheres capable of withstanding hydrostatic pressures of at least 6.9 MPa without the microspheres being significantly ruptured and having a density of at least 0.29 g/cc.

17. The composite material of claim 16 wherein the filler microspheres have an average particle size in the range of about 10 to 60 µm.

18. The composite material of claim 16 further comprising a substantially electrically insulating coating on the electrically conductive coating on the particulate filler.

* * * * *

UNITED STATES PATENT AND TRADEMARK OFFICE
CERTIFICATE OF CORRECTION

PATENT NO.    : 6,562,448 B1
DATED         : May 13, 2003
INVENTOR(S)   : Chamberlain It is certified that error appears in the above-identified patent and that said Letters Patent is hereby corrected as shown below:

Column 14,
Line 23, delete "w" and insert in place thereof -- -- W -- --.

Column 16,
Line 59, delete "combination of".

Signed and Sealed this

Sixth Day of July, 2004

JON W. DUDAS
*Acting Director of the United States Patent and Trademark Office*